Jan. 20, 1925.

W. M. BRITTON

LOCK NUT

Filed March. 12, 1924

1,523,393

INVENTOR.
William M. Britton
BY
Parsons & Bodell
ATTORNEYS.

Patented Jan. 20, 1925.

1,523,393

UNITED STATES PATENT OFFICE.

WILLIAM M. BRITTON, OF SYRACUSE, NEW YORK.

LOCK NUT.

Application filed March 12, 1924. Serial No. 698,590.

*To all whom it may concern:*

Be it known that I, WILLIAM M. BRITTON, a citizen of the United States, and a resident of Syracuse, in the county of Onondaga and State of New York, have invented a certain new and useful Lock Nut, of which the following is a specification.

This invention has for its object a locknut which is economical in manufacture, is tightly locked automatically on the bolt during the turning of the nut on the bolt, and which can be removed with an ordinary wrench or by unscrewing action, and in which its locking action is due to the distortion of the nut, warping the threads throughout the length of the bore of the nut out of helical form from normal to an abnormal position.

The invention consists in the novel features and in the combinations and constructions hereinafter set forth and claimed.

In describing this invention reference is had to the accompanying drawings in which like characters designate corresponding parts in all the views.

Figure 1:
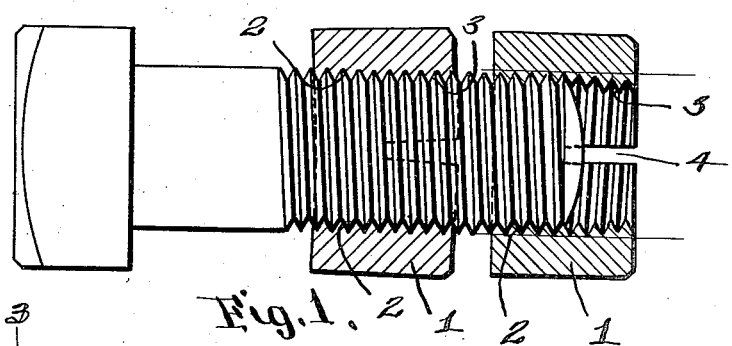
Figure 1 is an elevation of a bolt provided with this lock nut, it being shown as provided with two nuts for the purpose of illustrating different steps in the locking action. The nut being shown in section, and one of the nuts being threaded fully on the bolt, and the other being threaded part way on the bolt.
Figure 2:
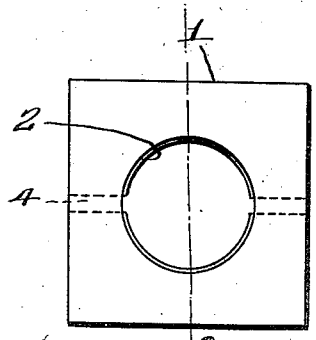
Figure 2 is a face view of the nut looking toward the advance end or entrance end of the nut.
Figure 3:
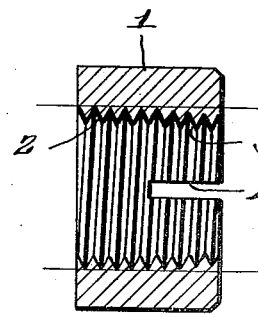
Figure 3 is a sectional view taken on line 3—3, Fig. 2.
Figure 4:
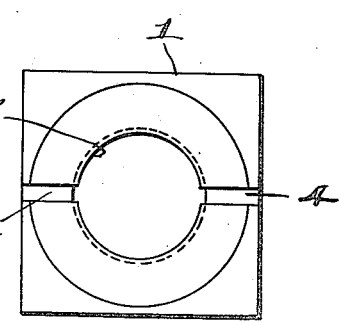
Figure 4 is a plan view of the nut or opposite view from that shown in Fig. 2.

I am aware that the threads of the nut or bolt have been specially formed, so as that either the threads of the nut or of the bolt warp out of normal. Such threads require expensive taps or drilling tools, which are difficult to manufacture, and which must be formed with greater precision than tools now used, for threading bolts and nuts. I am also aware that lock nuts have been made by tapping the nut, with the ordinary tap cutting a cylindrical helical thread, weakening one end of the nut by slotting it transversely, and then pinching together the slotted end, so that, the bore at one end is elliptical but in such construction the threads in the elliptical part of the bore are normally out of helical form when in an abnormal position, and are forced back to normal cylindrical helical form when the nut is turned on to the bolt, so that, the holding action is not by the warping of the threads, but by a clamping action when the threads are normal.

I am also aware that lock nuts have been formed with a portion of the bore cylindrical and provided with cylindrical helical threads, and the remaining portion tapered, and provided with conical helical threads, the nut being so formed or weakened that only the end formed with the conical threads distorts when the nut is turned on a bolt and the expanding of the weakened portion has no effect on that part of the body of the nut formed with the cylindrical bore, so that, the expansion of the conical portion, as the nut is screwed on to the bolt is limited to the binding effect of such conical portion and has no effect upon any other portion of the nut.

My invention has for its object a lock nut of such construction that the locking or binding action is brought about by the distortion or warping of the threads of the nut from a normal or helical form to an abnormal position out of helical form, such distortion or tendency to distort, extending practically throughout the length of the nut, so that, a binding effect due to such distortion from normal or helical to abnormal, or forces tending to distort the threads extends practically throughout the length of the nut or all the threads thereof.

In my lock nut the body 1 is solid and unitary and has substantially the same outside dimension or width from end to end so that, a portion of the body is not so weakened that the distortion is limited to the weakened portion; and the threaded bore thereof, comprises a cylindrical portion 2 and a conical portion 3, the threads of these portions being continuations of each other, and the threads of the conical portion normally following a true conical helical course, in contradistinction to the threads in an elliptical bore where the bore has been made elliptical by squeezing a cylindrical threaded bore into tapered form.

The portion, or outer end of the nut, formed with the conical bore is provided with a cut or slot 4 extending transversely of the nut, the nut being preferably provided with diametrically opposite radial slots 4 for the purpose of weakening the conical portion sufficiently, so that, it will spread outwardly, and the distortion due to such spreading will be transmitted to that portion of the body of the nut in which the cylindrical threads are formed.

Figure 5:
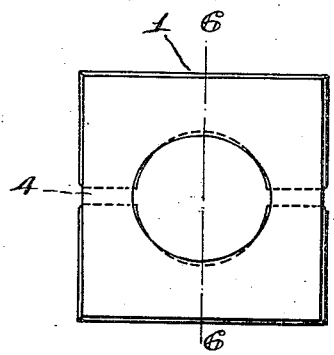
Figure 5 is a view similar to Fig. 2, showing the distortion of the advance end portion of the nut or the thread thereof, when the nut is turned on to a bolt, the bolt being omitted.
Figure 6:
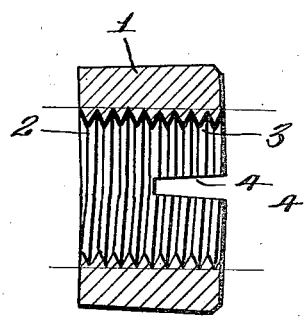
Figure 6 is a sectional view taken on line 6—6, Fig. 5.
Figure 7:
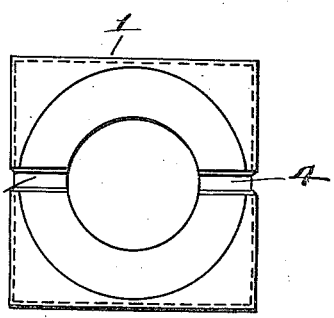
Figure 7 is a plan view similar to Fig. 4, of the nut showing the expanding action of the outer end of the nut when the nut is threaded fully on to the bolt, the bolt being omitted.

In operation, as the nut is turned on to the bolt the cylindrical threads first turn on to the bolt, so that, the starting of the nut on the bolt is the same as the ordinary nuts. When the nut is turned farther on to the bolt, so that, the bolt passes into the conical bore, the split portion of the nut formed with the conical bore spreads outwardly, and the threads warp from a true conical helical form to a cylindrical but abnormal form out of conical helical form and owing to their distorted position exert a binding effect upon the threads of the bolt which are of cylindrical helical form. Such outward spreading of the part of the body of the nut formed with the conical bore is transferred with a sort of leverage action to the portion of the nut in which the cylindrical bore is formed, so that, this portion is distorted, or a force is applied thereto, tending to distort it into an abnormal position shown in full lines, Fig. 5, so that, the threads of the cylindrical portion of the nut are also distorted out of normal or cylindrical helical form or there is a force tending to distort which tendency binds the nut on the bolt. The outward spreading of the end of the nut formed with the conical bore, also tends to warp or bend the entire nut as shown in Fig. 6.

It is obvious that the binding action of the threads of the nut on the bolt, is effected throughout the length of the nut, and that this binding action is due to the threads of the nut, distorting or having a force applied thereto tending to distort them from normal helical forms to abnormal forms.

This nut is particularly advantageous in that it does not require the use of special steel or heat treatment or a special thread in order to function properly and will operate in an entirely satisfactory manner when made of the same materials which are ordinarily used in the manufacture of nuts, and further, the nut can be removed from the bolt, and replaced many times without impairing its locking qualities and it does not damage the threads of the bolt. Furthermore this lock nut can be easily started on the bolt before the locking effect begins, thereby avoiding the crossing of the threads which occur in lock nuts in which the locking effect begins with the first thread of the nut. Also, this lock nut locks in any position on the bolt, as it is not necessary to screw the nut against an abutment surface, in order to lock the nut on the bolt, or in other words the locking effect of the nut is obtained by screwing the nut on to the bolt. However the act of screwing the nut against an adjacent surface greatly increases the locking effect of the nut.

It will be evident from the foregoing description that this simple, one piece lock nut has three locking actions, viz:

First:—The gripping action produced by the smaller diameter of the conical threaded bore being forced over the bolt of larger diameter.

Second:—The locking action produced by distorting the threads of the nut out of true helical form.

Third:—The locking action produced at the top of the nut due to the curved or distorted base of the nut being screwed forcibly against an adjacent surface.

What I claim is:

1. A lock nut having a cylindrical threaded portion at one end and a conical threaded portion at the other, said conical portion being split to weaken the base, all whereby the threads in the conical portion tend to distort outwardly from normal to abnormal form and the threads of the other portion tend to distort from normal to abnormal by the distortion of the first named end by the operation of threading the nut on the bolt.

2. A lock nut, having its bore cylindrical at its entrance end and conical at its opposite end, such bore being threaded, and the threads in the entrance portion of the bore being true cylindrical helical form, and the threads in the conical form being a true conical helical form, the end of the nut formed with a conical bore being cut transversely, and the body of the nut being solid, whereby when the nut is turned on to a bolt, the threads of the conical bore warp from a normal conical helical form to an abnormal position, and the threads of the cylindircal portion of the bore distort from a cylindrical helical form to an abnormal position.

3. A lock nut, having in combination, a helical threaded bore, and means for distorting all the threads out of helical form, by the operation of threading the nut on a threaded bolt.

4. A lock nut, comprising a unitary solid body, formed with a threaded bore, the threads of which normally follow a true helical course, the nuts being provided with means whereby when the nut is turned on a bolt the outer end of the body of the nut expands outward distorting the threads in such expanding portion out of normal helical form, and the inner end of the nut tends to clamp inward, and to distort the threads thereof out of helical form.

5. A lock nut, comprising a unitary solid body having a cylindrical threaded bore at its entrance end, and a conical threaded bore at its other end, the threads of the conical bore being continuations of the thread of the cylindrical bore, and the portion of the body of the nut formed with the conical bore, being formed with a transverse slot, all whereby when the nut is threaded on to a bolt, the conical portion is distorted outward, and the threads thereof distort from normal conical helical form to an abnormal position out of conical helical form, and the distortion of such portion formed with the conical bore, causes the portion formed with the cylindrical bore to distort and warp the threads thereof from normal cylindrical helical form to an abnormal position out of cylindrical helical form.

6. A lock nut, comprising a unitary solid body of substantially the same outside dimensions throughout the length of the nut, and having a bore formed with a threaded cylindrical portion and a threaded conical portion, the threads of the latter being cut with a conical tap, the portion of the nut formed with the conical bore being slotted transversely, to permit said conical portion to spread outward from normal to abnormal position when the nut is threaded on the bolt, and the cylindrical portion to be distorted from the normal to an abnormal position by the distortion of the conical portion.

In testimony whereof, I have hereunto signed my name, at Syracuse, in the county of Onondaga, and in the State of New York, this 26th day of Feb. 1924.

WILLIAM M. BRITTON.